(12) United States Patent
Yoon et al.

(10) Patent No.: US 7,136,329 B2
(45) Date of Patent: Nov. 14, 2006

(54) METHOD AND APPARATUS FOR CANCELING GLITCH NOISE FROM TRACK CROSSING SIGNAL

(75) Inventors: Hyeong-deok Yoon, Suwon-si (KR); Young-jun Ahn, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 172 days.

(21) Appl. No.: 10/309,308

(22) Filed: Dec. 4, 2002

(65) Prior Publication Data

US 2003/0156505 A1    Aug. 21, 2003

(30) Foreign Application Priority Data

Jan. 29, 2002    (KR) ................. 2002-5217

(51) Int. Cl.
*G11B 21/08*    (2006.01)
(52) U.S. Cl. .................. 369/30.11; 369/30.17
(58) Field of Classification Search ........... 369/30.1, 369/30.11, 30.12, 30.13, 30.14, 30.15, 30.16, 369/44.28, 44.27, 44.29
See application file for complete search history.

(56) References Cited

U.S. PATENT DOCUMENTS

| | | | | |
|---|---|---|---|---|
| 6,218,870 B1 * | 4/2001 | Wilson | ........................ | 327/34 |
| 6,621,773 B1 * | 9/2003 | Lin | ........................ | 369/30.14 |
| 6,741,532 B1 * | 5/2004 | Graba et al. | ............. | 369/44.28 |
| 6,757,226 B1 * | 6/2004 | Chan | ....................... | 369/30.13 |
| 7,042,812 B1 * | 5/2006 | Yoon et al. | .............. | 369/30.17 |
| 2003/0002403 A1 * | 1/2003 | Chan | ....................... | 369/30.13 |

FOREIGN PATENT DOCUMENTS

| | | | | |
|---|---|---|---|---|
| JP | 2000-285477 | 10/2000 | | |
| KR | 2002-026676 A | * 4/2002 | ................ | 369/30.1 |
| KR | 2002-031633 A | * 5/2002 | ................ | 369/30.1 |

* cited by examiner

*Primary Examiner*—Tan Dinh
(74) *Attorney, Agent, or Firm*—Sughrue Mion, PLLC

(57) ABSTRACT

Provided are a method and apparatus for canceling noise from a track cross signal, a method for controlling an optical disc drive, an optical disc drive, and an optical disc reproducing apparatus. The method for removing noise from a track cross signal includes (a) removing noise from the track cross signal by binarizing the track cross signal with reference to hysteresis set values that are determined according to a command speed for a tracking actuator; and (b) removing glitch noise from the binarized track cross signal based on a predetermined time value. Accordingly, it is possible to effective remove noise to obtain information regarding the precise speed and position of a desired track.

18 Claims, 10 Drawing Sheets

TRACK CROSS SIGNAL(LOW SPEED)

FIG. 4

TRACK CROSS SIGNAL(HIGH SPEED)

METHOD AND APPARATUS FOR CANCELING GLITCH NOISE FROM TRACK CROSSING SIGNAL

BACKGROUND OF THE INVENTION

This application claims the priority of Korean Patent Application No. 2002-5217, filed Jan. 29, 2002, which is incorporated herein in its entirety by reference.

1. Field of the Invention

The present invention relates to track searching on an optical disc drive (ODD), and more particularly, to a method and apparatus of canceling noise from a track cross signal generated when an optical spot (pickup) moves on an optical disc in the radial direction, i.e., it traverses tracks so as to search for a desired track, a method for controlling an optical disc drive, an optical disc drive, and an optical disc reproducing apparatus.

2. Description of the Related Art

In general, track searching on an optical disc is performed by a pickup included in an optical disc drive (ODD) by one of the following ways: (i) a direct search control method by which an optical spot reaches a desired track on an optical disc while searching all tracks that the optical spot passes through when it moves from a track in the radial direction; and (ii) a coarse seek control method by which an optical spot moves directly to a predetermined point on an optical disc, i.e., near a desired track, without searching any track, and then reaches the desired track by searching adjacent tracks. With the coarse search control method, it is easy to search for a desired track, but the total access time is long. On the other hand, although the direct search control method is complicated, the total access time is short. For this reason, recently, the use of the direct search control method has spread even for long-distance search of tracks on a compact disc (CD), a digital versatile disc (DVD) drive, and so on.

Figure 1:
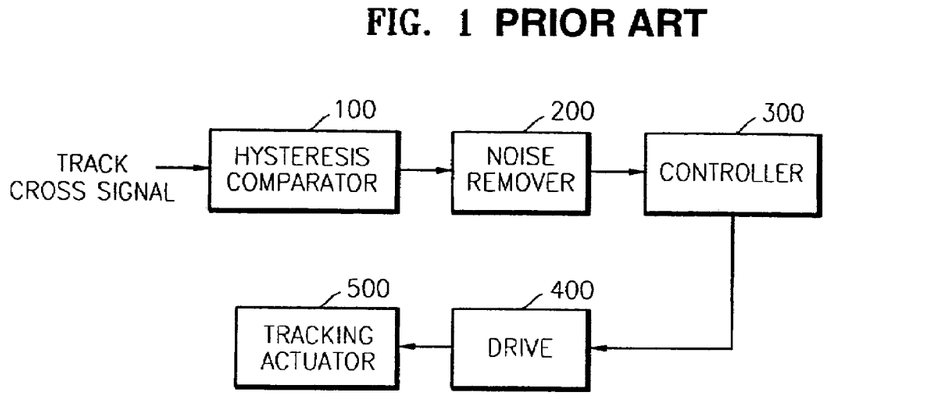
FIG. 1 is a block diagram of a portion of a conventional optical disc drive.

FIG. 1 is a block diagram of a portion of a conventional optical disc drive. Referring to FIG. 1, the optical disc drive includes a hysteresis comparator 100, a noise removing apparatus 200 for canceling noise from a track cross signal, a controller 300, a drive 400, and a tracking actuator 500.

Here, the track cross signal is a signal read when a pickup (not shown) moves from a predetermined point on an optical disc in the radial direction and then the optical spot transverses tracks on the optical disc. The track cross signal can be used in detecting the speed and position of the optical spot (pickup). The track cross signal is binarized by the hysteresis comparator 100 and its glitch noise is removed by the noise removing apparatus 200. The hysteresis comparator 100 binarizes the track cross signal based on two reference values, i.e., upper and lower levels determined according to hysteresis set values. Then, the controller 300 generates a control signal in response to the binarized track cross signal whose noise was removed, and outputs the control signal to the drive 400. Next, the drive 400 drives the tracking actuator 500 in response to the control signal so as to move the pickup to a desired point on the optical disc.

Figure 2A:
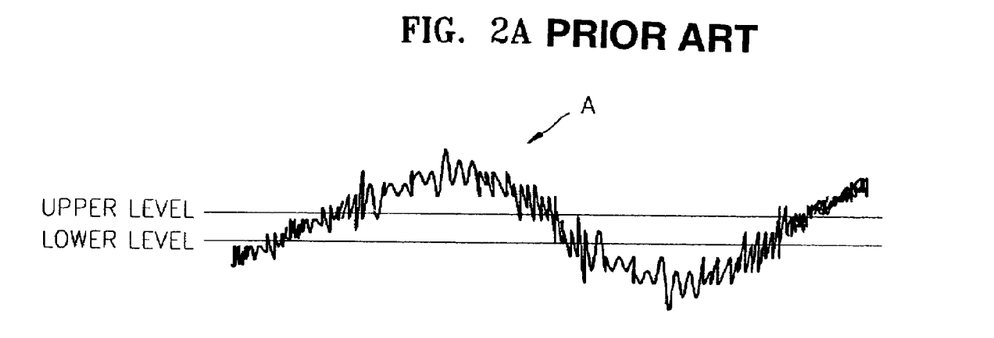
FIGS. 2(a), 2(b) and 2(c) are timing diagrams explaining a conventional method for canceling noise from a track cross signal.
Figure 2B:
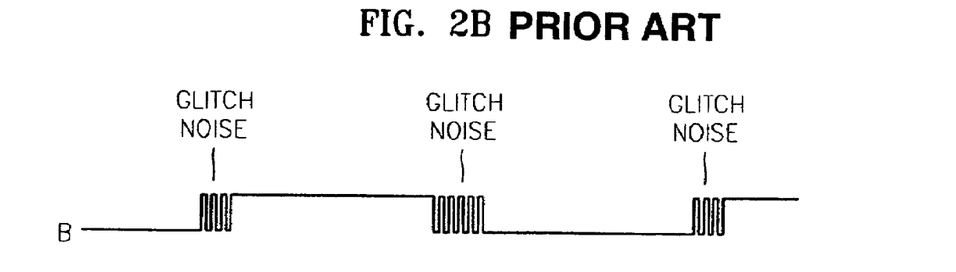
Figure 2C:
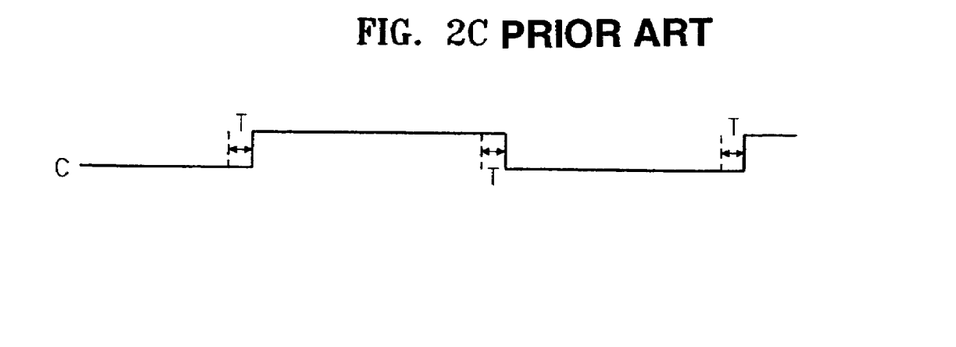

FIGS. 2(a), 2(b) and 2(c) are timing diagrams explaining a conventional method for canceling noise from a track cross signal. Referring to FIGS. 2(a)–2(c), A denotes a track cross signal that contains noise and is detected by an optical disc. The hysteresis comparator 100 having upper and lower levels as reference levels are used to binarize the track cross signal A, thereby obtaining a track zero cross signal B. That is, it is possible to remove noise contained in the track cross signal A between the reference levels by binarizing the track cross signal A using two reference values determined according to hysteresis set values. In conclusion, the larger an interval between the two reference levels, i.e., the larger a difference between the upper and lower levels, the more the noise in a track cross signal is removed. However, reference levels, i.e., hysteresis set values, of the conventional hysteresis comparator 100 are fixed levels.

Meanwhile, the track zero cross signal B contains noise, i.e., glitch noise, which was not completely removed from the track cross signal A, by the hysteresis comparator 100. The noise removing apparatus 200 removes the glitch noise from the track zero cross signal B after one level of the track zero cross signal B changes into another level and then the changed level lasts for a predetermined time T, and outputs the result a signal C.

Figure 3:
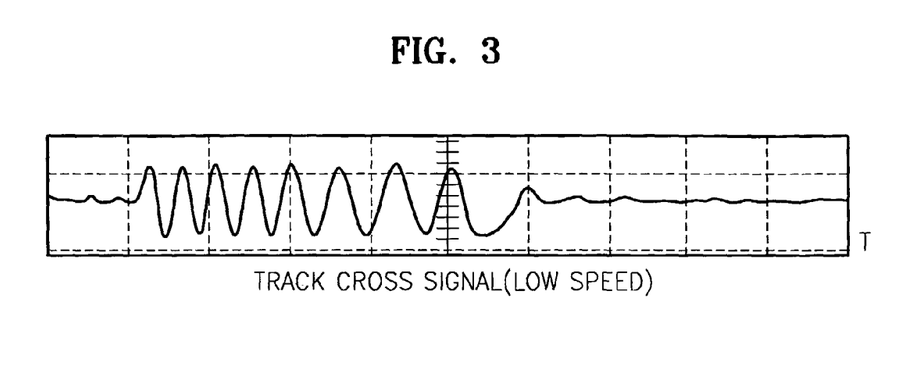
FIG. 3 is a waveform diagram of a track cross signal obtained during low-speed local area track search.
Figure 4:
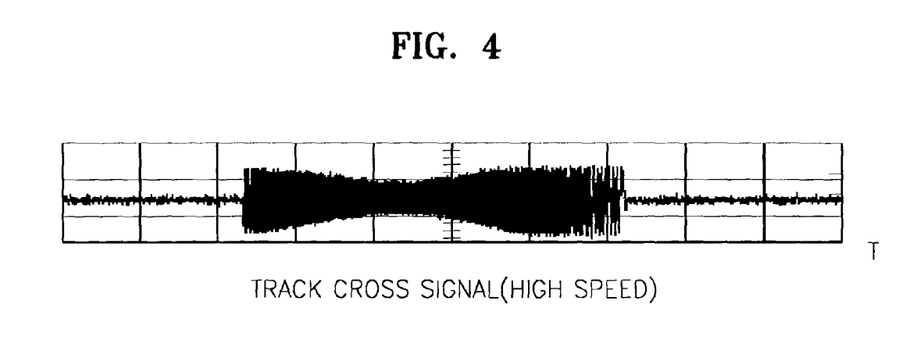
FIG. 4 is a waveform diagram of a track cross signal obtained during high-speed long distance track search.

FIG. 3 is a waveform diagram of a track cross signal obtained by short-distance track searching at low speed, and FIG. 4 is a waveform diagram of a track cross signal obtained by long-distance track searching at high speed. As shown in FIGS. 3 and 4, the frequency of the track cross signal obtained by low-speed track searching is long ranging from several KHz to tens KHz, whereas the frequency of the track cross signal obtained by high-speed track searching is very high ranging from several KHz to hundreds KHz. A track search signal is passed through a band pass filter to remove noise from a high-frequency signal. According to the high-frequency cut-off characteristics of the band pass filter, the amplitude of a track search signal generated in a section where an optical spot (pickup) moves fast, is less than that of a track search signal in a section where the optical spot moves slowly.

To increase the rejection ratio of noise during track searching at low speed, it is preferable that a hysteresis set value be set to be high so that a difference between these two reference levels is increased. However, in the event that an offset between these two reference levels becomes excessively increased, the amplitude of the track cross signal may not fall within a predetermined range during track searching at high speed. This makes it difficult to detect the track zero cross signal B. Therefore, hysteresis set values of the conventional hysteresis comparator 100 are set such that an offset between these two reference levels is relatively small in consideration of the amplitude of the track cross signal generated when searching a certain track at high speed. However, in this case, it is possible to completely remove noise from the track cross signal during track searching at low speed.

SUMMARY OF THE INVENTION

To solve the above problems, it is a first object of the present invention to provide a method and apparatus for completely removing noise from a track cross signal irrespective of the speed of track searching of an optical disc, a method for controlling an optical disc drive using the above method, an optical disc drive, and an optical disc reproducing apparatus.

It is a second object of the present invention to provide a method for effectively removing noise from a track cross signal while adaptively changing hysteresis set values according to the speed of track searching of an optical disc, a method for controlling an optical disc drive based on the above method, a noise removing apparatus, an optical disc drive, and an optical disc reproducing apparatus.

To achieve one aspect of the above objects, there is provided a method for removing noise from a track cross signal, the method including the steps of: (a) removing noise from the track cross signal by binarizing the track cross signal with reference to hysteresis set values that are determined according to a command speed for a tracking actuator; and (b) removing glitch noise from the binarized track cross signal based on a predetermined time value.

Preferably, during step (a), the track cross signal is binarized by changing its level to a first level when its amplitude is larger than an upper level which is determined based on the hysteresis set values, changing its level to a second level when its amplitude is smaller than a lower level which is also determined based on the hysteresis set values, or maintaining its original level when its amplitude is larger than or the same as the lower level of the track cross signal and smaller than or the same as the upper level.

Preferably, step (b) includes changing a predetermined level of the track cross signal to another level if it is maintained from the edges of the binarized track cross signal for a predetermined time value, and maintaining the predetermined level otherwise.

To achieve another aspect of the above objects, there is provided a method for controlling an optical disc drive, the method including the steps of: (a) reading a track cross signal from an optical disc; (b) removing noise from the track cross signal by binarizing the read track cross signal with reference to the hysteresis set values that are determined according to a command speed for a tracking actuator; (c) removing glitch noise from the binarized track cross signal based on a predetermined time value; (d) measuring the speed of a pickup from the track cross signal whose noise is removed and that is binarized; and (e) providing a compensation value, which is determined according to an offset between the measured speed of the pickup and the command speed, to the tracking actuator.

Preferably, during step (b), the track cross signal is binarized by changing its level to a first level when its amplitude is larger than an upper level determined according to the hysteresis set values, changing the level of the track cross signal to a second level when its amplitude is smaller than a lower level determined according to the hysteresis set values, and maintaining its level when its amplitude is larger than or the same as the lower level, and is smaller than or the same as the upper level.

Preferably, step (c) includes maintaining the binarized track cross signal at a previously determined level until the expiration of a predetermined time value measured from the most recent one of a rising edge and a falling edge of the binarized track cross signal.

To achieve still another aspect of the above objects, there is provided a noise removing apparatus including a controller for generating a command speed for a tracking actuator; a comparator for binarizing a track cross signal read from an optical disc with reference to hysteresis set values determined according to the command speed; and a noise remover for removing glitch noise from the track cross signal that is binarized by the comparator.

To achieve yet another aspect of the above objects, there is provided an optical disc drive including the above noise removing apparatus.

To achieve further another aspect of the above objects, there is provided an optical disc drive including a tracking actuator for moving a pickup that irradiates light on an optical disc; a comparator for binarizing a track cross signal read from the optical disc with reference to hysteresis set values that are determined based on a command speed for a tracking actuator; a noise remover for removing glitch noise from the binarized track cross signal with reference to a predetermined time value; and a controller for providing the command speed to the comparator, the controller for measuring the speed of a pickup from a signal output from the noise remover, obtaining an offset, which is a compensation value, between the speed of the pickup and the command speed, and providing the compensation value to the tracking actuator.

To achieve still further another aspect of the above objects, there is provided a reproducing apparatus including the optical disc drive.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 6:
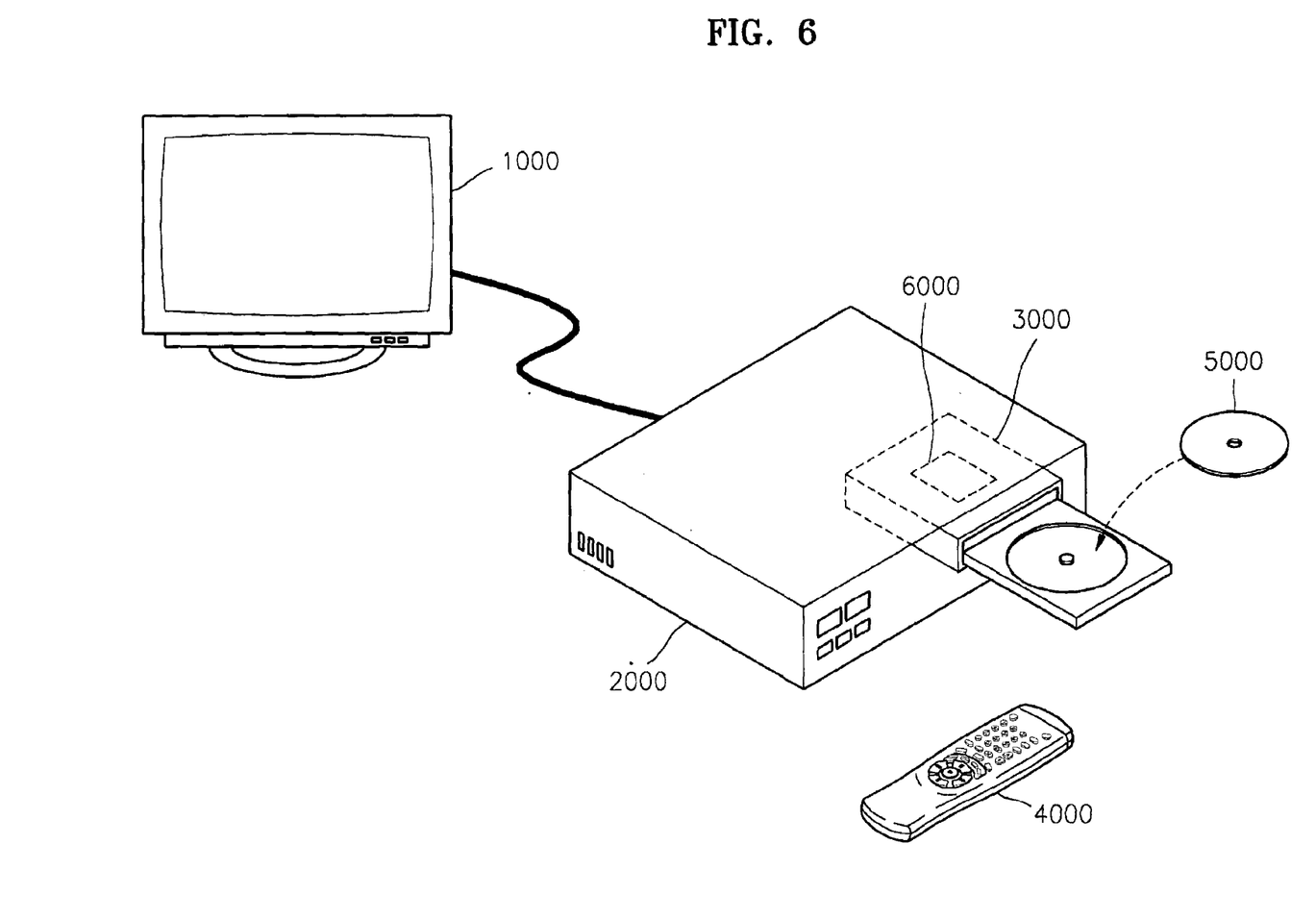
FIG. 6 is a block diagram of a first embodiment of a noise removing apparatus according to the present invention.

FIG. 6 is a schematic view of an optical disc playback system according to a preferred embodiment of the present invention. Referring to FIG. 6, the optical disc playback system includes a display 1000 and a reproducing apparatus 2000. In the reproducing apparatus 2000, which an information storage medium, is installed an optical disc drive 3000 having a disc deck on which an optical disc 5000 is placed. The optical disc drive 3000 includes a pickup (not shown) for detecting a track cross signal generated by the optical disc 5000, and a noise removing apparatus for removing noise from the detected track cross signal. A user operates the reproducing apparatus 2000 and the display 1000 handling a remote controller 4000 having various controlling buttons. If the user plays back the contents recorded on a desired track of the optical disc 5000, the optical disc drive 3000 makes the pickup move to the desired track, reads and decodes the contents, and transmits the decoded contents to the display 1000. In this embodiment, the display 1000 is realized as a television or a monitor, and displays on a screen a signal transmitted from the reproducing apparatus 2000.

Figure 5:
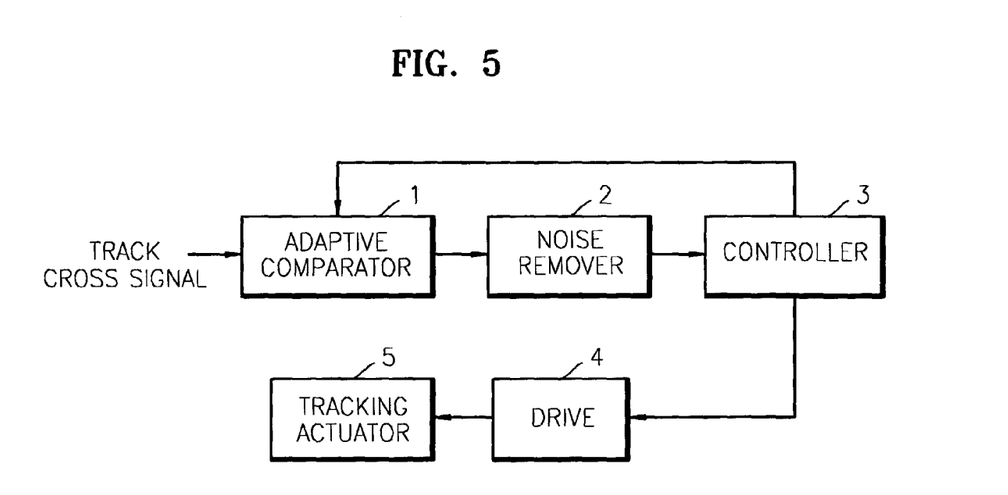
FIG. 5 is a schematic view of a reproduction system according to a preferred embodiment of the present invention.
Figure 7:
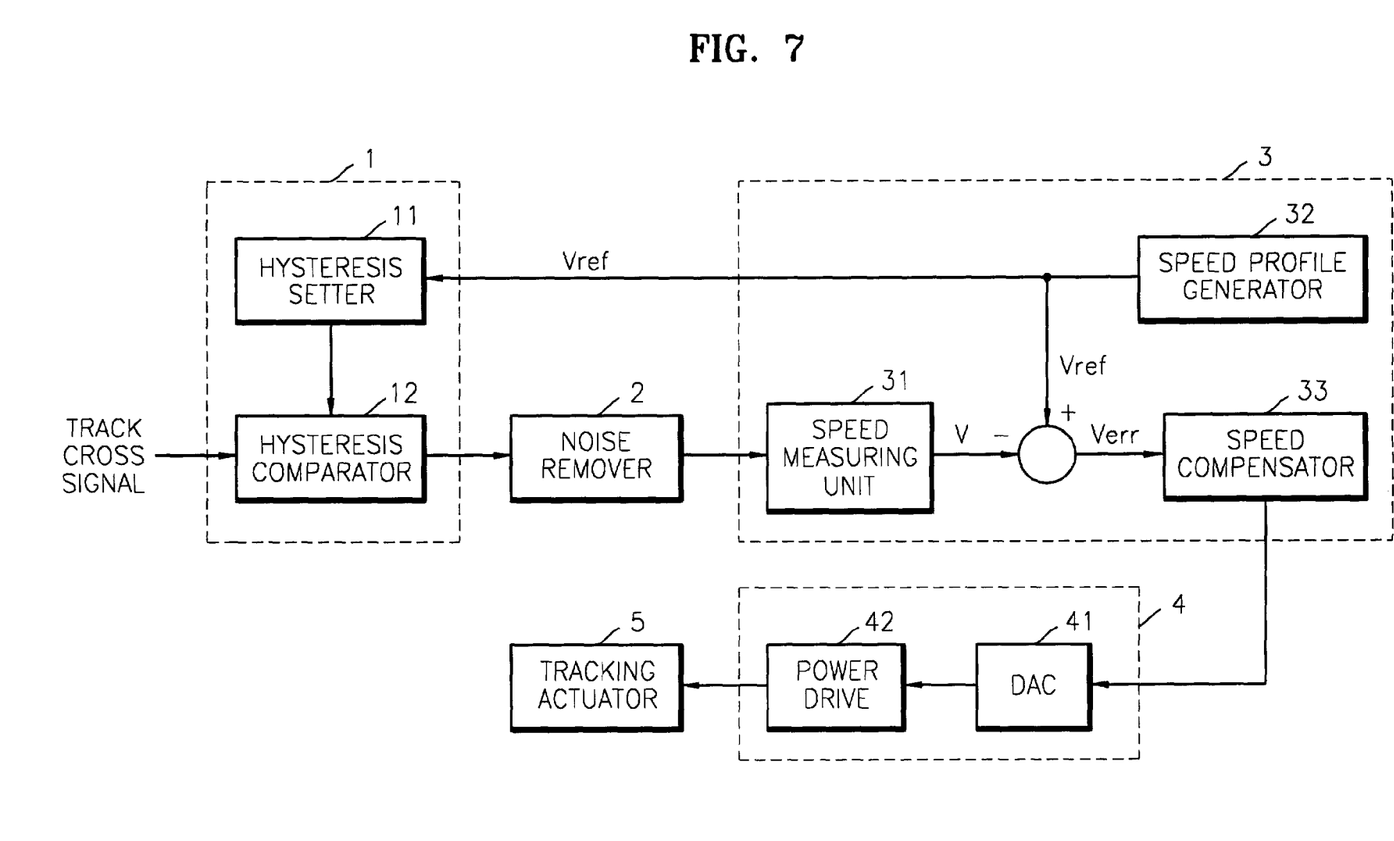
FIG. 7 is a block diagram of a second embodiment of the noise removing apparatus of FIG. 6 according to the present invention.

FIG. 7 is a block diagram of a preferred embodiment of a noise removing apparatus 6000 of FIG. 6, according to the present invention. Referring to FIG. 5, the noise removing apparatus 6000 includes an adaptive comparator 1, a noise remover 2, a controller 3, a drive 4, and a tracking actuator 5.

Here, a track cross signal is a signal having a frequency band of several KHz-1 MHz, and is detected when an optical pickup traverses the optical disc 5000 (shown in FIG. 6) in the radial direction. The controller 3 generates a command speed for the tracking actuator 5, and transmits the command speed to the adaptive comparator 1. Then, the adaptive comparator 1 binarizes the track cross signal with reference to two reference values, i.e., upper and lower levels, determined according to hysteresis set values which are changed adaptively according to the command speed of the pickup (optical spot). More specifically, the level of the track cross signal is changed to a first level when the level of the track cross signal is larger than or the same as the upper level, changed to a second level when the level of the track cross signal is smaller than or the same as the lower level, and fixed when the level of the track cross signal is larger than the lower level or smaller than the upper level. Here, that "the level of the track cross signal is changed adaptively according to the command speed" means that these two reference values are determined such that an offset between the upper and lower levels is relatively large when the speed of the pickup is slow, i.e., during the low-speed track searching. To the contrary, these two reference values are determined such that an offset between the upper and lower levels is relatively small when the speed of the pickup is fast, i.e., during the high-speed track searching. The command speed varies depending on the distance, speed, and position of a desired track to be searched for, and the hysteresis set values vary according to the command speed.

The noise remover 2 removes glitch noise from the track cross signal binarized by the adaptive comparator 1 using predetermined noise removing width (time value) T, thereby obtaining a track zero cross signal. That is, the noise remover 2 does not change the level of the track zero cross signal until a predetermined level of the track cross signal is maintained from rising edge or falling edge for the time value T. The drive 4 actuates the tracking actuator 5 adaptively according to the command speed, and then, the tracking actuator 5 moves the pickup to move the optical spot on a desired track.

The noise removing apparatus 6000, which is attached to the optical disc drive 3000, may be installed in a recording device for recording information on an optical disc, and/or a playback device for playing back information on an optical disk, or a computer system.

FIG. 7 is a view of an embodiment of the noise removing apparatus of FIG. 6. Here, the components that are the same as those in the first embodiment of the noise removing apparatus are indicated by the same reference numerals, and explanations thereof will be omitted.

Referring to FIG. 7, the noise removing apparatus includes an adaptive comparator 1, an adaptive noise remover 2, a controller 3, a drive 4, and a tracking actuator 5. The adaptive comparator 1 includes a hysteresis setter 11 and a hysteresis comparator 12. The controller 3 includes a speed measuring unit 31, a speed profile generator 32, and a speed compensator 33. Also, the drive 4 includes a DA converter 41 and a power drive 42.

More particularly, the hysteresis setter 11 has a hysteresis table that contains hysteresis set values mapped to correspond to command speeds Vref, respectively. The hysteresis setter 11 is given the command speed Vref by the speed profile generator 32, and applies corresponding hysteresis set values to a register (not shown) of the hysteresis comparator 12, referring to the hysteresis table. Then, the hysteresis comparator 12 binarizes the track cross signal based on the hysteresis set values, such as upper and lower levels, set by the hysteresis setter 11. For instance, the level of the track cross signal is binarized to correspond to a first level when the amplitude of the track cross signal is larger than or the same the upper level, binarized to correspond to a second level when its amplitude is smaller than or the same as the lower level; or binarized without changing the level of the track cross signal when its amplitude is larger than the lower level or is smaller than the upper level. Here, the reason two reference values, i.e., the upper and lower levels, are used in binarizing the track cross signal is that much noise is contained in the track cross signal and thus the amplitude of the track cross signal changes in part excessively.

Meanwhile, the noise remover 2 removes glitch noise from the track zero cross signal output from the hysteresis comparator 12 using predetermined rejection width (time value T). The noise remover 2 may include, for example, a resistor (not shown) and a counter (not shown). Before counting a predetermined count value (time value T), the noise remover 2 starts counting at the rising edge or falling edge of the track zero cross signal and removes glitch noise from the track zero cross signal by maintaining the previous level of the track zero cross signal when the its level changes, or converting the current level of the track zero cross signal into another level when the previous level is not changed until the counting of the predetermined counting value is completed.

The speed measuring unit 31 measures the speed of the optical spot (pickup) based on the track zero cross signal transmitted from the noise remover 22. Here, one period of the track zero cross signal corresponds to a track. Thus the speed V of the optical spot (pickup) can be measured from the track zero cross signal, indicated on a time axis. The speed profile generator 32 generates a speed profile indicating the command speed Vref according to the position and distance of a point where the optical spot (pickup) is to be moved. At this time, a difference Verr between the command speed Vref and measured speed V, i.e., Vref−V=Verr, is transmitted to the speed compensator 33. Then, the speed compensator 33 sends an offset obtained based on the difference Verr to the DA converter 41. Next, the DA converter converts the offset into a corresponding analog signal and transmits the analog signal to the power drive 42. Thereafter, the power drive 42 transmits power for the analog signal to the tracking actuator 5 and operates the tracking actuator 5 to search for a desired track of an optical disc.

Figure 8:
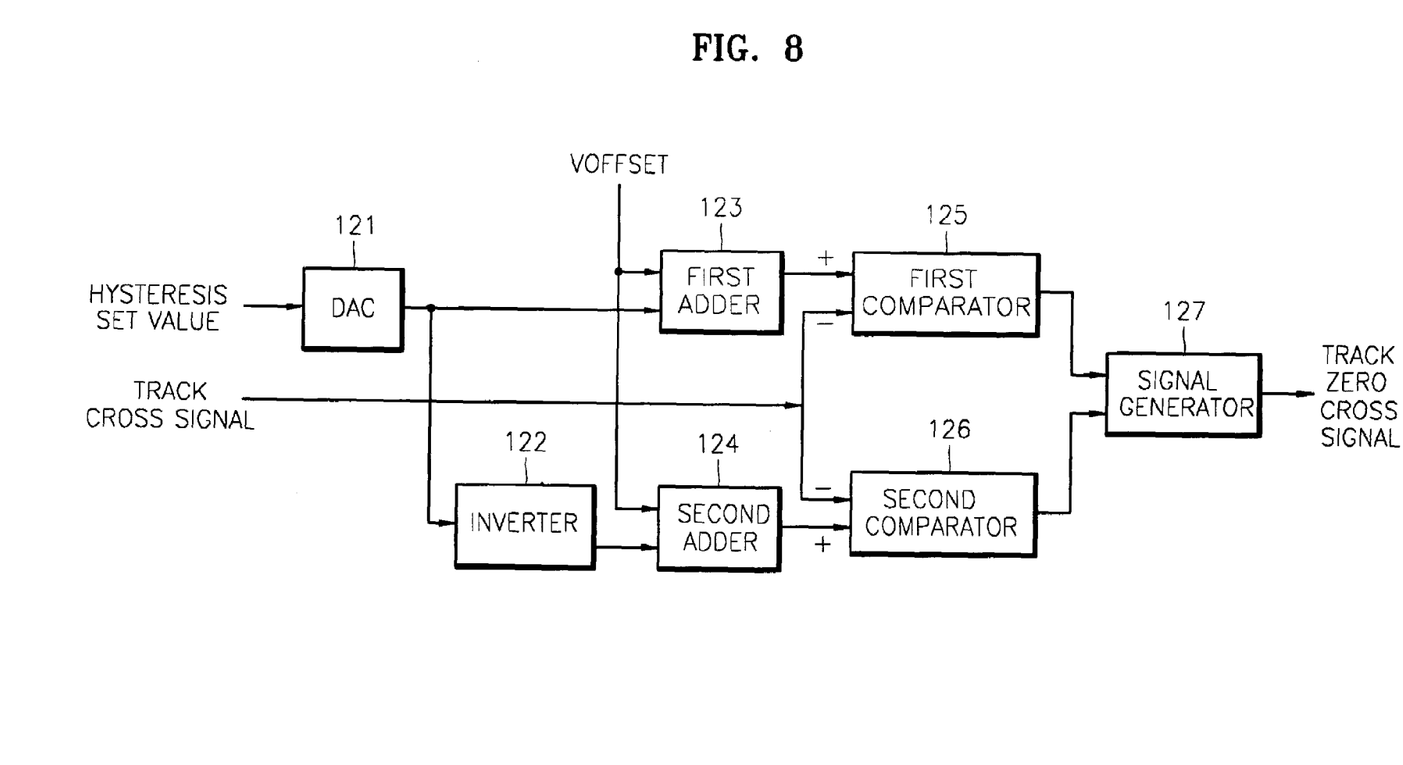
FIG. 8 is a block diagram of a third embodiment of the noise removing apparatus of FIG. 7 according to the present invention.
Figure 9A:
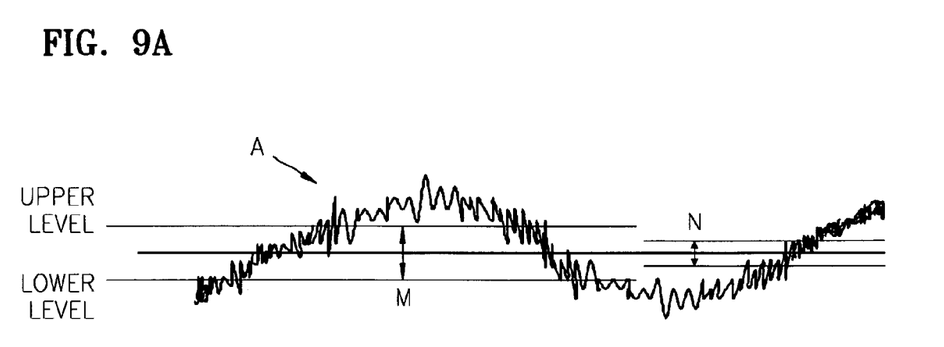
FIGS. 9(a), 9(b), 9(c) and 9(d) are timing diagrams explaining a method for removing noise from a track cross signal using a noise removing apparatus according to the present invention.
Figure 9B:
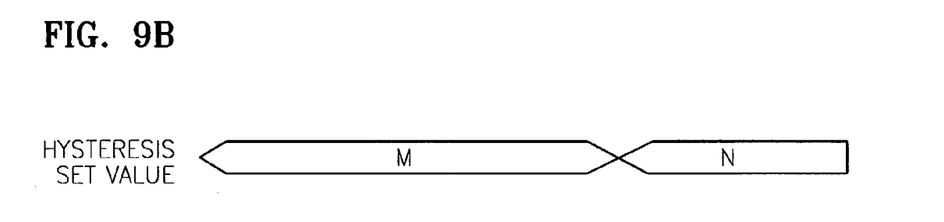
Figure 9C:
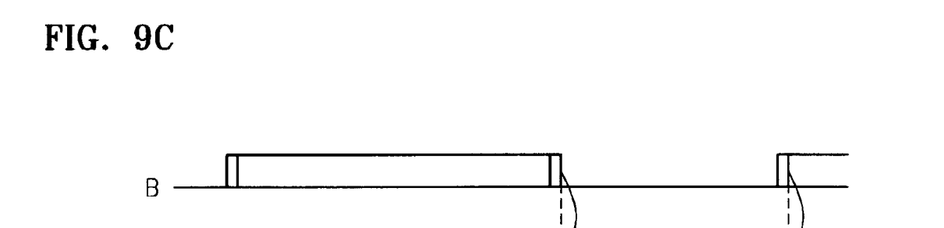
Figure 9D:
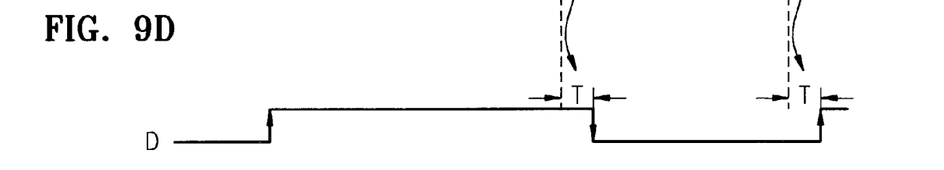

FIG. 8 is a diagram of another embodiment of the hysteresis comparator 12 of FIG. 7. Referring to FIG. 8, the hysteresis comparator 12 includes a DA converter 121, an inverter 122, first and second adders 123 and 124, first and second comparators 125 and 126, and a signal generator 127.

In the operation of the hysteresis comparator 12 of FIG. 8, the DA converter 121 outputs a corresponding analog signal when hysteresis set values are applied to the DA converter 121. Next, the first adder 123 adds the analog signal with system offset voltage Voffset, and applies the result as a first reference value (upper level) to the first comparator 125. Then, the first comparator 125 outputs a high signal to the signal generator 127 when the level of a track cross signal is larger than the first reference value (upper level). Meanwhile, a signal output from the DA converter 121 is inverted by the inverter 122, added with the system offset voltage Voffset by the second adder 124, and applied as a second reference value (lower level) to the second comparator 126. The second comparator 126 receives the second reference value (lower level) and outputs a high signal when the level of the track cross signal is smaller than the second reference value (lower level). Signals output from the first and second comparators 125 and 126 are applied to the signal generator 127, and the signal generator 127 generates and outputs a track zero cross signal, which rises at a rising edge of the signal output from the first comparator 125 and falls at a falling edge thereof.

The above hysteresis comparator 12 is just a preferred embodiment of the present invention and thus can be variously realized, for example, by combining several gates.

FIGS. 9(a), 9(b), 9(c) and 9(d) are timing diagrams explaining a method for removing noise from a track cross signal using a noise removing apparatus according to the present invention. Referring to FIG. 9(a)–9(d), in FIG. 9(a), A denotes a track cross signal, in FIG. 9(c), B denotes a track zero cross signal that is the track cross signal A binarized with regard to upper and lower levels according to hysteresis set values M and N (shown in FIG. 9(b)) determined adaptively according to the present invention, and D (shown in FIG. 9(d)), denotes a signal in which glitch noise is removed using a predetermined time value T of the track zero cross signal B. When the level of the track zero cross signal B changes, the counting is performed with regard to a rising edge or falling edge of a system clock. The level of the signal D is maintained in the event that the level of the track zero cross signal B changes again before the counting for the time value T. However, the level of the track zero cross signal D is changed if the level of the track zero cross signal B is kept until the counting is performed for the time value T.

Figure 10A:
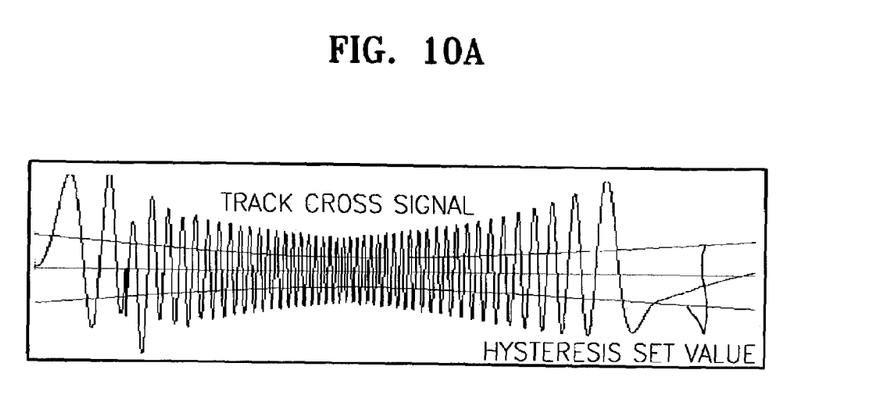
FIGS. 10(a), 10(b), and 10(c) are waveform diagrams illustrating examples of a command speed, a track cross signal, and hysteresis set values according to the present invention.
Figure 10B:
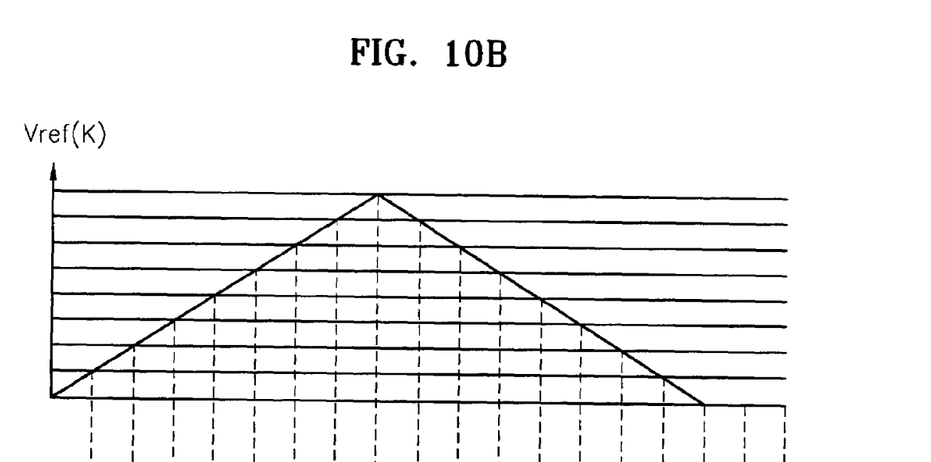
Figure 10C:
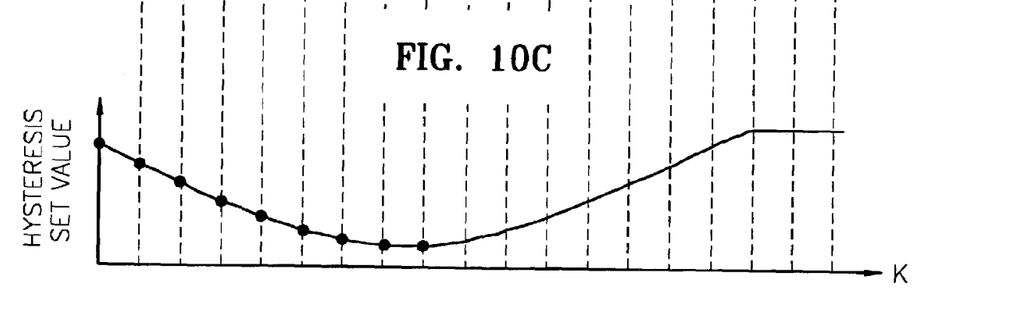

FIGS. 10(a) through (c) are waveform diagrams illustrating a preferred embodiment of a command speed, a track cross signal, and hysteresis set values measured based on the command speed and the track cross signal, according to the present invention. In particular, FIG. 10 (b) shows that a command speed Vref in the form of a triangle wave, generated by the speed profile generator of FIG. 7. FIG. 10(a) shows an example of a track cross signal generated when a pickup (optical spot) follows the command speed Vref, and hysteresis set values. In general, a track cross signal is detected from an optical disc. From FIG. 9(a), it is noted that the amplitude of a track cross signal, which is searched at high speed, is shorter than that of a track cross signal searched at low speed. Therefore, hysteresis set value is determined adaptively according to the speed of the optical spot (pickup), i.e., the amplitude of the track cross signal. In other words, hysteresis set values are always less than the amplitude of the track cross signal. However, the hysteresis set value is determined to be relatively larger during the search of a desired track at low speed, and is determined to be relatively smaller during the search at low speed.

FIG. 10(c) shows that hysteresis set values determined in consideration of the command speed Vref. For purposes of illustration only, in this embodiment, the hysteresis set value is determined to be about a half of the amplitude of the track cross signal. In a hysteresis table stored in the hysteresis setter 11 are recorded the range of the command speed Vref, and eight hysteresis set values corresponding to eight sections equally divided from 0 through the maximum speed. Here, k denotes an address pointer of the hysteresis table. In fact, the hysteresis set values are determined through a simulation or experiment.

Hereinafter, a method for canceling noise from a track cross signal, according to the present invention, will be described with reference to the accompanying drawings.

Figure 11:
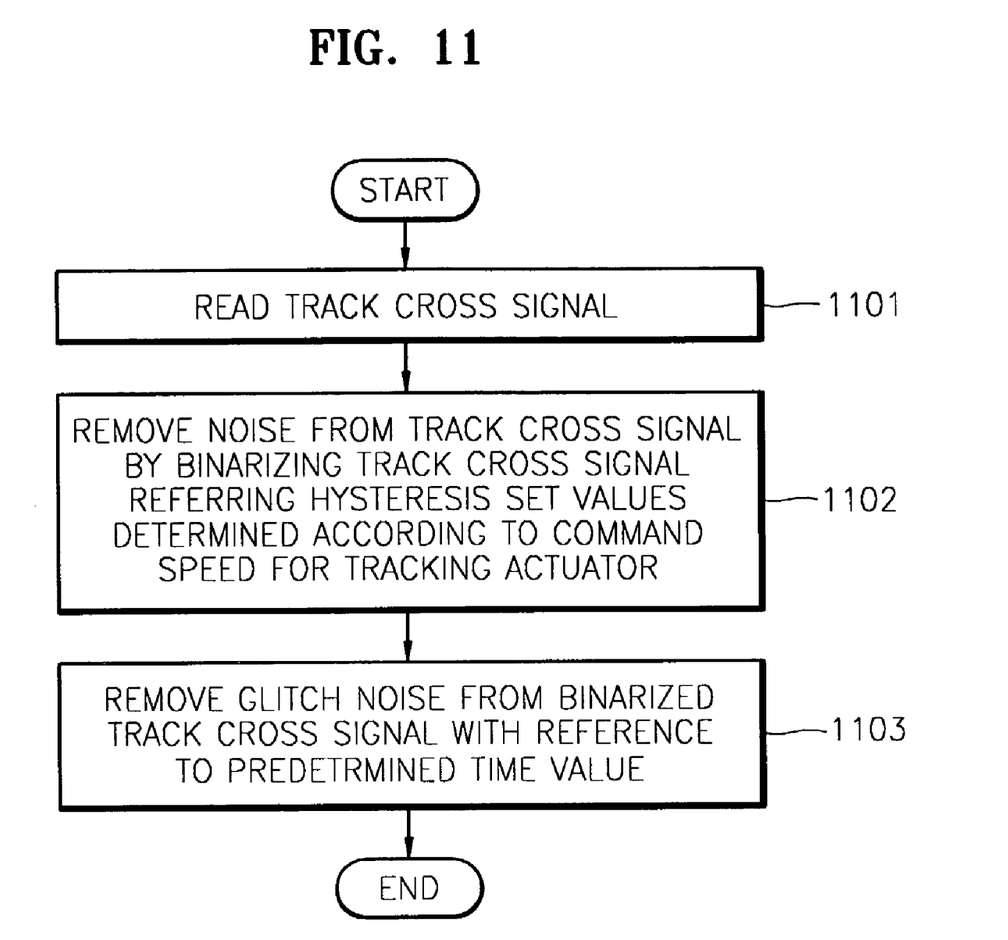
FIG. 11 is a flow chart explaining a preferred embodiment of a method for removing noise from a track cross signal according to the present invention.

FIG. 11 is a flow chart explaining a preferred embodiment of a method for canceling noise from a track cross signal according to the present invention. In this method, a noise removing apparatus 6000 of FIG. 6 (or an optical disc drive 3000 or a reproducing apparatus 2000) reads a track cross signal generated when a photo spot of a pickup (not shown) transverses tracks of an optical disc in step 1101. Then, the noise removing apparatus 6000 binarizes the track cross signal with reference to hysteresis set values that are determined in consideration of a command speed Vref for a tracking actuator 5 of FIG. 7 in step 1102. Next, glitch noise is removed from the binarized track cross signal using a predetermined time value T in step 1103.

Figure 12:
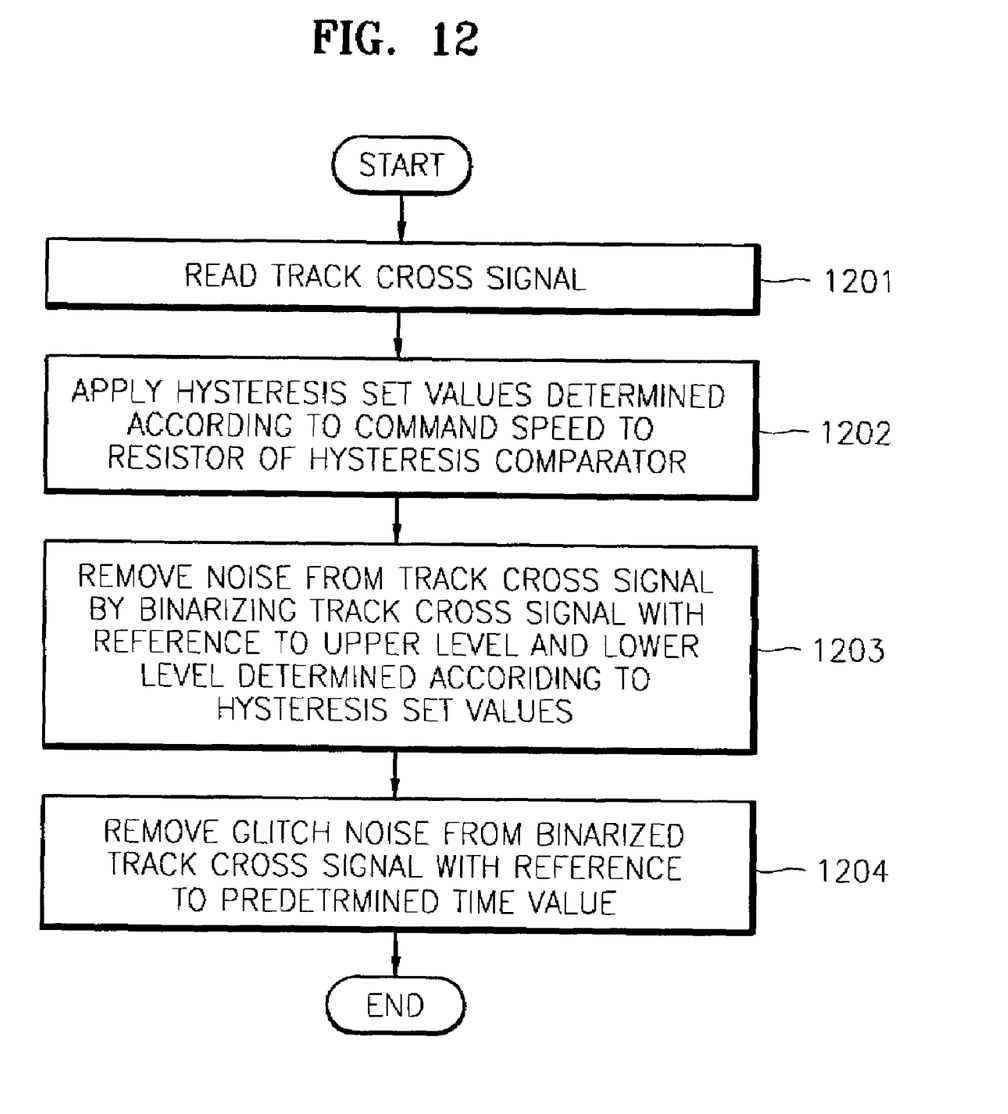
FIG. 12 is a flow chart explaining the method of FIG. 11.

FIG. 12 is a flow chart explaining an embodiment of the method of FIG. 11. Referring to FIG. 12, a noise removing apparatus 6000 (or an optical disc drive 3000 or a reproducing apparatus 2000) of FIG. 6 reads a track cross signal generated when a photo spot transverses tracks of an optical disc in step 1201. A hysteresis setter 11 of FIG. 7 applies corresponding hysteresis set values to a resistor (not shown) of a hysteresis comparator 12 referring to a hysteresis table, based on a command speed Vref generated by a speed profile generator 32 in step 1202. Then, the hysteresis comparator 12 removes noise from the track cross signal by binarizing the track cross signal with reference to the hysteresis set values, i.e., an upper level and a lower level, applied to the resistor in step 1203. After step 1203, glitch noise is removed from the track cross signal by maintaining a predetermined level of the binarized track cross signal if the level is maintained for a predetermined time value T and changing the level otherwise in step 1204. More specifically, the hysteresis comparator 12 binarizes the track cross signal by changing the level of the track cross signal to a first level when the level of the track cross signal is larger than the upper level, changing the level of the track cross signal to a second level when the level of the track cross signal is smaller than the lower level, and maintaining the original level of the track cross signal when this level is larger than or the same as the lower level or smaller than or the same as the upper level.

Figure 13:
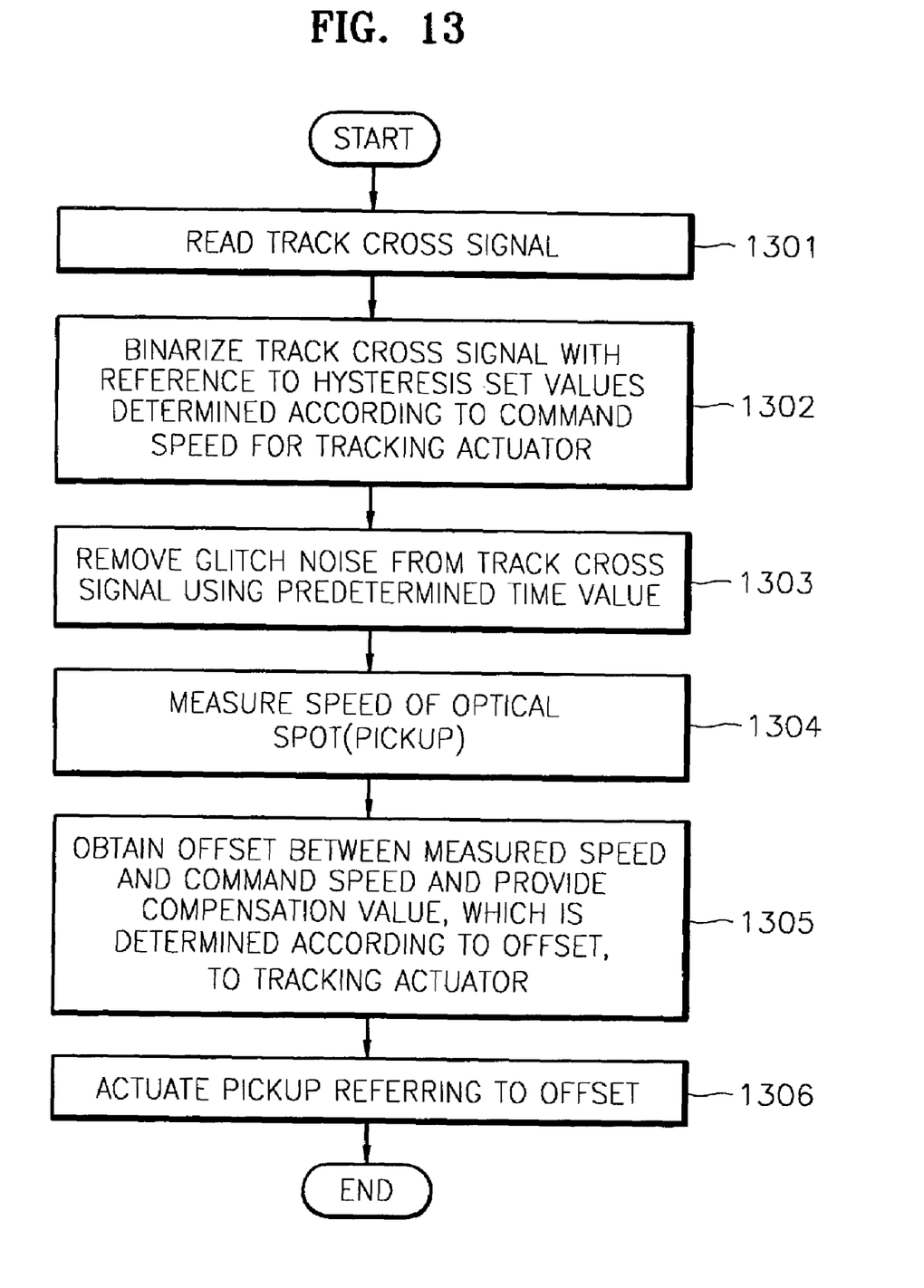
FIG. 13 is a flow chart explaining a preferred embodiment of a method for controlling an optical disc drive (a reproducing apparatus) according to the present invention.

FIG. 13 is a flow chart explaining a method for controlling a preferred embodiment of an optical disc drive 3000 of FIG. 6 (or a reproducing apparatus 2000). Referring to FIG. 13, the optical disc drive 3000 or a reproducing apparatus 2000 reads a track cross signal generated when an optical spot transverses tracks of an optical disc in step 1301. Next, the optical disc drive 3000 (the reproducing apparatus 2000) removes noise from the track cross signal by binarizing the track cross signal with reference to hysteresis set values that are determined in consideration of a command speed Vref for a tracking actuator 5 of FIG. 7 in step 1302. Then, glitch noise is removed from the track cross signal using a predetermined time value T, thereby obtaining a track zero cross signal in step 1303. Next, the optical disc drive 3000 (or the reproducing apparatus 2000) measures the speed of an optical spot (pickup) from the track zero cross signal having no noise in step 1304, calculates an offset between the measured speed and the command speed Vref, and provides a compensation value, which is obtained based on the offset, to the tracking actuator 5 in step 1305. Then, the tracking actuator 5 actuates a pickup (not shown) and searches a track of the optical disc in response to the applied control signal.

While this invention has been particularly shown and described with reference to preferred embodiments thereof, it will be understood by those skilled in the art that various changes in form and details may be made therein without departing from the spirit and scope of the invention as defined by the appended claims and equivalents.

Recently, optical disc drives (ODDs) are developed to reduce seek time of track searching of an optical disc so as to reduce access time spent on recording/reproducing information on/from the optical disc. For this reason, a desired track of ODD is searched by a direct search control method, which does not require latency time for track pull-in. The direct search control method is also applicable to long-distance searching track.

As described above, with a method for canceling noise from a track cross signal according to the present invention, it is possible to effectively removing noise so as to obtain information regarding the precise speed and position of a desired track by binarizing the track cross signal with reference to hysteresis set values that are determined adaptively according to the speed of track searching. Further, a pickup of an optical disc drive is controlled in response to a track search signal. Thus it is possible to effectively control the pickup by canceling the noise from the track search signal.

What is claimed is:

1. A method for removing noise from a track cross signal, the method comprising:
   (a) determining a command speed for a tracking actuator;
   (b) searching values corresponding to the determined command speed from a hysteresis table stored in a memory;
   (c) setting hysteresis set values directly based on the searched values;
   (d) removing noise from the track cross signal by binarizing the track cross signal with reference to the hysteresis set values; and
   (e) removing glitch noise from the binarized track cross signal based on a predetermined time value.

2. The method for claim 1, wherein during (d) the track cross signal is binarized by changing its level to a first level when its amplitude is larger than an upper level which is determined based on the hysteresis set values, changing its level to a second level when its amplitude is smaller than a lower level which is also determined based on the hysteresis set values, or maintaining its original level when its amplitude is larger than or the same as the lower level of the track cross signal and smaller than or the same as the upper level.

3. The method for claim 1, wherein (e) comprises changing a predetermined level of the track cross signal to another level if it is maintained from the edges of the binarized track cross signal for a predetermined time value, and maintaining the predetermined level otherwise.

4. A method for controlling an optical disc drive, the method comprising:
   (a) reading a track cross signal from an optical disc;
   (b) removing noise from the track cross signal by binarizing the read track cross signal with reference to the hysteresis set values that are determined according to a command speed for a tracking actuator;
   (c) removing glitch noise from the binarized track cross signal based on a predetermined time value;
   (d) measuring the speed of a pickup from the track cross signal whose noise is removed and that is binarized; and
   (e) providing a compensation value, which is determined according to an offset between the measured speed of the pickup and the command speed, to the tracking actuator.

5. The method for claim 4, wherein during (b) the track cross signal is binarized by changing its level to a first level when its amplitude is larger than an upper level determined according to the hysteresis set values, changing the level of the track cross signal to a second level when its amplitude is smaller than a lower level determined according to the hysteresis set values, and maintaining its level when its amplitude is larger than or the same as the lower level, and is smaller than or the same as the upper level.

6. The method for claim 4, wherein (c) comprises changing a predetermined level of the track cross signal to another level if it is maintained from the edges of the binarized track cross signal for a predetermined time value, and maintaining the predetermined level otherwise.

7. A noise removing apparatus comprising:
   a controller for determining a command speed for a tracking actuator;
   a hysteresis setter for searching values corresponding to the determined command speed from a hysteresis table stored in a memory and setting hysteresis set values directly based on the searched values;
   a comparator for binarizing a track cross signal read from an optical disc with reference to the set hysteresis set values; and
   a noise remover for removing glitch noise from the track cross signal that is binarized by the comparator.

8. The noise removing apparatus of claim 7, wherein the comparator binarizes the track cross signal by changing the level of the track cross signal to a first level when its amplitude is larger than a first reference value according to the hysteresis set values, changing the level of the track cross signal to a second level when its amplitude is smaller than a second reference value, and maintaining the original level of the track cross signal when its amplitude is larger than or the same as the second reference value, and smaller than or the same as the first reference value.

9. The noise removing apparatus of claim 7, wherein the noise remover changes a predetermined level of the track cross signal to another level if it is maintained from the edges of the binarized track cross signal for a predetermined time value, and maintaining the predetermined level otherwise.

10. An optical disc drive comprising:
    a controller for determining a command speed for a tracking actuator;
    a hysteresis setter for searching values corresponding to the determined command speed from a hysteresis table stored in a memory and setting hysteresis set values directly based on the searched values;
    a comparator for binarizing a track cross signal read from an optical disc with reference to the hysteresis set values; and a noise remover for removing glitch noise from the binarized track cross signal with reference to predetermined time values.

11. The optical disc drive of claim 10, wherein the comparator binarizes the track cross signal by changing the level of the track cross signal to a first level when its amplitude is larger than an upper level determined according to the hysteresis set values, changing the level of the track cross signal to a second level when its amplitude is smaller than a lower value determined according to the hysteresis set values, and maintaining the level of the track cross signal when its amplitude is larger than or the same as the lower value, and smaller than or the same as the upper value.

12. The optical disc drive of claim 10, wherein the noise remover changes comprises changing a predetermined level of the track cross signal to another level if it is maintained from the edges of the binarized track cross signal for a predetermined time value, and maintaining the predetermined level otherwise.

13. An optical disc drive comprising:
a tracking actuator for moving a pickup that irradiates light on an optical disc;
a comparator for binarizing a track cross signal read from the optical disc with reference to hysteresis set values that are determined based on a command speed for a tracking actuator;
a noise remover for removing glitch noise from the binarized track cross signal with reference to a predetermined time value; and
a controller for providing the command speed to the comparator, the controller for measuring the speed of a pickup from a signal output from the noise remover, obtaining an offset, which is a compensation value, between the speed of the pickup and the command speed, and providing the compensation value to the tracking actuator.

14. The optical disc drive of claim 13, wherein the comparator binarizes the track cross signal by changing the level of the track signal to a first level when its amplitude is larger than an upper value determined according to the hysteresis set values, changing the level to a second level when its amplitude is smaller than a lower value determined according to the hysteresis set values, and maintaining the level of the track cross signal when its amplitude is larger than or the same as the lower value, or smaller than or the same as the upper value.

15. The optical disc drive of claim 13, wherein the comparator changes comprises changing a predetermined level of the track cross signal to another level if it is maintained from the edges of the binarized track cross signal for a predetermined time value, and maintaining the predetermined level otherwise.

16. A reproducing apparatus having an optical disc drive, comprising:
a tracking actuator for moving a pickup that irradiates light on an optical disc;
a comparator for removing noise from a track cross signal read from the optical disc drive by binarizing the track cross signal with reference to hysteresis set values determined according to a command speed for a tracking actuator;
a noise remover for removing glitch noise from the binarized track cross signal with reference to predetermined time values;
a controller for providing the command speed to the remover, the controller for measuring the speed of a pickup from a signal output from the noise remover, obtaining an offset, which is a compensation value, between the speed of the pickup and the command speed, providing the compensation value to the tracking actuator.

17. The reproducing apparatus of claim 16, wherein the comparator binarizes the track cross signal by changing the level of the track cross signal to a first level when its amplitude is larger than an upper value determined according to the hysteresis set values, changing the level to a second level when its amplitude is smaller than a lower value determined according to the hysteresis set values, and maintaining the level of the track cross signal when its amplitude is larger than or the same as the lower value, and smaller than or the same as the upper value.

18. The reproducing apparatus of claim 16, wherein the noise remover changes comprises changing a predetermined level of the track cross signal to another level if it is maintained from the edges of the binarized track cross signal for a predetermined time value, and maintaining the predetermined level otherwise.

* * * * *